United States Patent
Matthews

(10) Patent No.: US 7,212,746 B2
(45) Date of Patent: May 1, 2007

(54) SHORT HAUL OPTICAL COMMUNICATIONS

(75) Inventor: Manyalibo Joseph Matthews, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 559 days.

(21) Appl. No.: 10/763,895

(22) Filed: Jan. 23, 2004

(65) Prior Publication Data
US 2005/0163510 A1   Jul. 28, 2005

(51) Int. Cl.
*H04B 10/00* (2006.01)
(52) U.S. Cl. .......................... 398/159; 398/81
(58) Field of Classification Search ........... 398/150, 398/159, 193, 208, 147, 152, 81; 359/338, 359/349
See application file for complete search history.

(56) References Cited

U.S. PATENT DOCUMENTS 5,365,362 A * 11/1994 Gnauck et al. ............. 398/150
5,418,637 A * 5/1995 Kuo ........................... 398/159
5,611,016 A   3/1997 Fangmann
6,778,782 B1 * 8/2004 Watley et al. ............. 398/147

OTHER PUBLICATIONS

Agrawal, P.J. et.al. Dispersion Penalty . . . J of Lightwave Technology, 6(5), 620-625 (1988).
Ogawa, K. Analysis of Mode-Partition Noise in Laser Systems. IEEE J Of Quantum Electron. QE-18, 849-855 (1982).
Journal of Lightwave Technology, 21(9), 2002-2009, Sep. 2003.
IEEE Journal of Selected Topics in Quantum electronics, 7(2) 328-333, Mar.-Apr. 2001.

* cited by examiner

Primary Examiner—David C. Payne

(57) ABSTRACT

Short haul optical communication networks using multi longitudinal mode lasers are susceptible to significant degradation from mode partition noise. Losses from such noise in short haul networks are substantially reducible by employing an additional fiber with specific properties. This additional fiber is chosen to have a slope for its wavelength versus dispersion behavior that is the negative of that for the transmission fiber.

10 Claims, 3 Drawing Sheets

POWER

WAVELENGTH

POWER

WAVELENGTH

DISPERSION

WAVELENGTH $W_c$

DISPERSION $W_c$

WAVELENGTH

SHORT HAUL OPTICAL COMMUNICATIONS

TECHNICAL FIELD

This invention relates to optical communication systems and in particular to optical communication systems using multi longitudinal mode lasers.

BACKGROUND OF THE INVENTION

Much effort has been expended to limit bit error rates in long haul optical communication systems, i.e. systems having bit rates greater than 10 Gbps and a distance between reshaping points for the optical pulses of more than 100 Km. For a given transmission distance, a variety of dispersion effects significantly influence this bit error rate. For example, chromatic dispersion involves effects stemming from the dependence of fiber traversal rate on signal wavelength. Since the signal is always a spectral composite of different wavelengths (although often a very narrow spectral composite) one end of such spectrum trails the other as the fiber is traversed. This spreading of the signal leads to the overlap of adjacent signal pulses and the concomitant increase in error.

Initially to mitigate this error optical fiber was employed in long haul systems that had a wavelength (approximately 1300 nanometers) where dispersion (but not the change of traversal rate with wavelength) was essentially zero. Thus wavelengths closely surrounding 1300 nm experience little dispersion. However, as fiber run distances became longer, systems were designed to operate in the region between 1480 and 1610 nanometers rather than around 1300 nm because, among other things, the theoretical minimum signal attenuation per kilometer for glass fiber is at approximately 1550 nanometers. In addition, wavelength division multiplexed signals are most efficiently amplified together rather than by separating the channels and individually providing amplification. Multichannel amplifiers such as those used in long haul systems have a useful operating range around 1550 not 1300 nanometers.

For typical operating parameters used in long haul wavelength-division-multiplex communication, it is essential that the transmission fiber have a non-zero dispersion at the operating wavelength to avoid the significant adverse consequences associated with non-linear effects. As a result, long haul fiber is designed to have non-zero dispersion at 1550 nanometers. The adverse effects resulting from non-zero dispersion have been substantially reduced in such systems using cumulative dispersion compensation modules. These modules contain a suitable length of fiber that produces a dispersion approximately equal to that incurred on the transmission line but of opposite sign. Accordingly, the cumulative transmission line dispersion is substantially compensated. Thus, the use of dispersion compensating modules in long haul applications has become routine.

In summary, long haul communication systems have evolved to approaches employing operating wavelengths in the range 1480 to 1610 nm (designated S, C, and L bands) with typical standard single mode fibers (SSMF) having significant dispersion at such operating wavelengths and with the effects of such dispersion compensated using a dispersion compensating module. Because system penalties due to dispersion are compounded by large transmitter spectral widths, single longitudinal mode lasers (SLMs) that have narrow spectral widths are routinely favored over multi-longitudinal mode lasers (MLMs). Such SLMs are quite expensive (presently as much as several thousand dollars depending on bit rate and other requirements). However, since SLMs emit a single longitudinal mode, complications involving wavelength broadening due to multiple laser modes are avoided.

The approach is significantly different for short haul transmission, i.e. transmission lengths between transmitter and receiver of less than or equal to 20 Km. In local area networks presently contemplated for high bit transfer rates (greater than 1 Gbps) between, for example, a local central office and a consumer, the use of multiple SLMs is not economic. Typically, for such systems, MLMs having a current price on the order of $50 (fifty dollars) appear to be an economic necessity. Such lasers generally emit in the wavelength range 1260 to 1360 nm and thus transmission fiber (e.g. SSMF) having zero dispersion near 1310 nanometers is usually employed with such lasers. Since local area networks have fiber lengths between sender and receiver of 20 Km or less the lower attenuation of the 1500 nanometer operating range is not essential, and the use of fiber having a zero dispersion at approximately the operating wavelength is employed beneficially. This benefit seems especially advantageous since non-linear effects are substantially less significant for such local area networks and dispersion compensation at 1300 nm does not seem needed.

Nevertheless, the use of MLMs introduces an error source not present when SLMs are used. In particular, an effect denominated mode partition noise (MPN) becomes significant. (See Agrawal, G. P. et. al. *Journal of Lightwave Technology,* 6(5), 620 (1988) and Ogawe, "Analysis of Mode-Partition Noise in Laser Systems," *IEEE Journal of Quantum Electronics,* QE-18, 849 (1982) which are hereby incorporated by reference in their entirety for a discussion of MPN.) This noise results from the interaction of the fiber dispersion with the constantly changing power distribution among laser modes. A typical instantaneous power distribution among modes for MLMs is shown in FIG. 1. As time progresses, the power present in each such mode changes due to factors such as fluctuations in drive current and diode temperature. The manner of such change is typically quantified by a mode partition coefficient, k, that is given values between zero and one. A laser having k=1 emits all its power in a single mode but that mode having the entire power output is constantly changing. In such a laser at time zero the mode power spectrum would be shown in FIG. 2 while at time t=$t_1$, the power output would be in a different mode at a different wavelength, as shown in FIG. 3. For a laser with mode partition coefficient equal 0, all modes are emitted at the same time and the distribution of power remains substantially constant with time.

A laser having a mode partition coefficient equal 1 is the least desirable since the entire power of the laser continuously shifts all from one wavelength to all in another wavelength. Although lasers with low partition coefficients are more desirable, they are difficult to reliably produce, and thus it is not currently feasible to base a system on a requirement for low partition coefficient lasers.

However, even for lasers of relatively low mode partition coefficient, (k, in the range 0.2 to 0.5) the transmission of a multitude of modes (typically between 30 and 50 detectable modes) having a spectrum of wavelengths (modes) exhibiting time dependent power fluctuations yields a significant source of error. As denominated by Agrawal et.al. supra, this error results from the interaction of these transmitted modes having time dependent power fluctuations and the wavelength dependent effects introduced by the fiber. Further, the mode spectrum of the laser varies with temperature often changing as much as 0.3 nanometers per degree centigrade. This temperature effect also contributes to the difficulty associated with the use of MLMs because the center wavelength shifts and results in a change in wavelength dependent fiber dispersion. In addition to these temperature-dependent spectral effects, there is (for a given temperature) significant variation in center wavelength (up to 100 nanometers) among lasers.

Generally, the method employed to satisfactorily reduce MPN has been to narrow the spectrum actually injected into the fiber by employing expedients such as fiber Bragg gratings, high-pass filters, or even to revert to the more expensive SLMs. (See, for example, *Journal of Lightwave Technology*, 21(9), 2002 (2003) and *IEEE Journal of Selected Topics in Quantum Electronics*, 7(2), 328 (2001).) Nevertheless an approach that significantly reduces MPN without the substantial increased cost of single mode lasers or the additional cost associated with other optical components is quite desirable.

SUMMARY OF THE INVENTION

In short haul networks such as passive optical networks (PON) it is possible to significantly reduce MPN by employing in the same optical path between a transmitter and a receiver both a transmission fiber having a dispersion zero (wavelength at which wavelength dispersion equals zero) in the 1312 nm operating region, e.g., in the range 1260 to 1360 nm, and a length of additional fiber having specific characteristics. In particular, the additional fiber should have in the spectral region of transmission a dispersion to wavelength dependency with a slope of opposite sign to that of the transmission fiber. That is, at the central wavelength of the transmitted laser output spectrum the first derivative of dispersion with respect to wavelength at the central operating wavelength has a sign opposite that for the transmission fiber at the same wavelength. Thus if the transmission fiber has a dispersion to wavelength characteristics as shown in FIG. 4, showing a positive slope, the corresponding slope for the added fiber should be negative, as shown in FIG. 5. The length of the added fiber, its slope, and the value of its dispersion for the central wavelength, $W_c$, of the laser output spectrum depends not only on the laser characteristics but also on the characteristics of the transmission fiber. (Central operating wavelength for purposes of the invention is defined as the power-weighted-average wavelength of all transmitted modes.) It is desirable to restrict the level of MPN system penalty to a manageable level, i.e. 20 dB or less. Reliable calculation of the length of additional fiber suitable to make such system penalty is possible using:

$$L_{AF} \approx (S_{o,TF}/-S_{o,AF})L_{TF} \quad (1)$$

where $L_{AF}$ is the length of additional fiber, $L_{TF}$ is the length of the transmission fiber, $S_{o,AF}$ is the first derivative of the dispersion with respect to wavelength at the operating central wavelength for the additional fiber, and $S_{o,TF}$ is the corresponding property for the transmission fiber.

The MPN system penalty is well approximated by the equation:

$$\alpha_{mpn} = -5 \log \{1 - \tfrac{1}{2}(k\pi B\sigma_\lambda Q)^2 [S_{o,TF}L_{TF}(\lambda-\lambda_{op}) + S_{o,AF}L_{AF}(\lambda_0-\lambda_{op})]\} \quad (2)$$

where the bit error rate equals $=[1/Q(2\pi)^{-1/2}]e^{-z/2}$, $z=Q^2$, B is the bit rate, $\sigma_\lambda$=the root-mean-square spectral line width of the laser (typically 3 nm), $L=L_{AF}+L_{TF}$, $S_{o,AF}$, and $S_{o,TF}$ as defined in equation (1), $\lambda_{op}$=the central operating wavelength, D=the total dispersion over L per unit length of total fiber, and $\lambda_0$ is the wavelength at which wavelength dependent dispersion is zero.

Often for k values in the range 0.2 to 0.6 and $L_{TF}$=20 for typical transmission fibers having $\lambda_0$ at approximately 1310 nm and $S_{o,TF}$ in the range 0.08 to 0.095 ps/nm²Km, an additional fiber with dispersion slope in the range −0.5 to −0.6 ps/nm²Km for operating wavelength in the range 1260 to 1360 is employed.

In one embodiment for a PON, the central office transmits using an SLM while return transmissions from the user is accomplished using an MLM in conjunction with the requisite additional fiber. In this manner, the more expensive SLM is used only at the central office in relatively small numbers while the much larger number of lasers required for end users is satisfied using the significantly cheaper MLMS. The additional fiber is positioned in the optical path of the MLM optical transmission but not in that of the SLM. The invention is employable with other expedients to reduce dispersion such as dispersion compensation modules.

DETAILED DESCRIPTION

Figure 1:
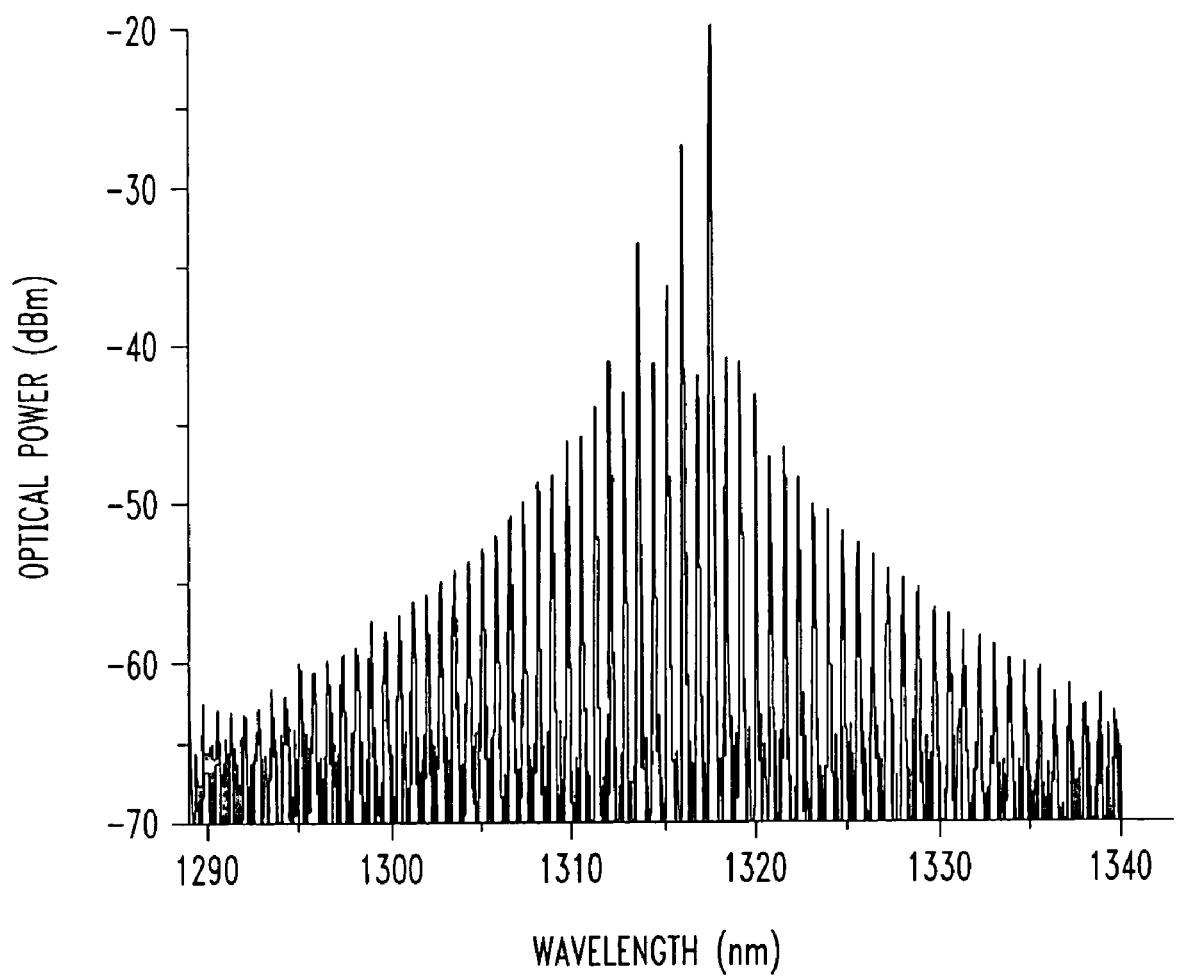
FIGS. 1–5 illustrate concepts associated with the invention.
Figure 2:
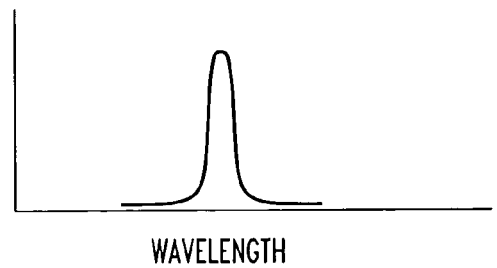
Figure 3:
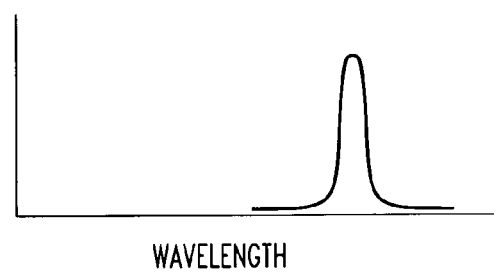
Figure 4:
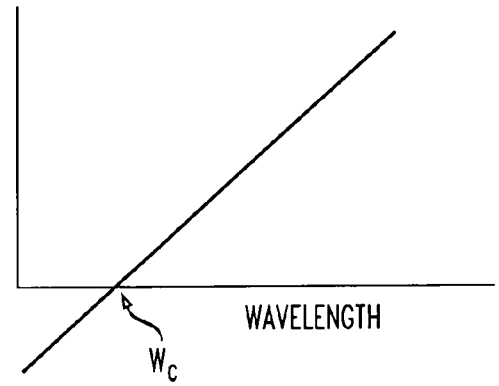
Figure 5:
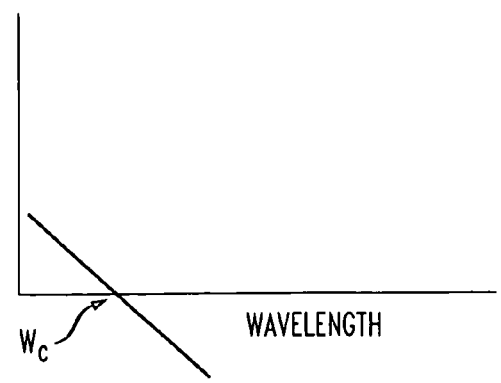

Mode partition noise is significantly reduced by employing a specific combination of fibers in a system having a transmitter to receiver distance of at least 1 Km and no greater than 20 Km. A multi longitudinal mode laser is employed as the transmission light source, for example, either at 1) the service provider, at 2) one or a plurality of end users, or 3) both. To reduce the MPN, two types of fibers are employed. The length of each fiber depends on the extent of compensation desired but it is desirable to restrict MPN system penalty (as defined by equation (2) to 20 dB or less. Reliable calculation of the length of additional fiber suitable to make such system penalty is possible using:

$$L_{AF} \approx (S_{o,TF}/-S_{o,AF})L_{TF} \quad (1)$$

where $L_{AF}$ is the length of additional fiber, $L_{TF}$ is the length of the transmission fiber, $S_{o,AF}$ is the first derivative of dispersion with respect to wavelength at the central operating wavelength for the additional fiber, and $S_{o,TF}$ is the corresponding property for the transmission fiber.

The MPN system penalty is well approximated by the equation:

$$\alpha_{mpn} = -5 \log \{1 - \tfrac{1}{2}(k\pi B\sigma_\lambda Q)^2 [S_{o,TF}L_{TF}(\lambda-\lambda_{op}) + S_{o,AF}L_{AF}(\lambda_0-\lambda_{op})]\} \quad (2)$$

where the bit error rate equals $=[1/Q(2\pi)^2]e^{-z/2}$, $Z=Q^2$, B is the bit rate $\sigma_\lambda$=the root-mean-square spectral line width of the laser (typically 3 nm), $L=L_{AF}+L_{TF}$, $S_{o,AF}$, and $S_{o,TF}$ as defined in equation (1), $\lambda_{op}$=the central operating wavelength, D=the total dispersion over L per unit length of total fiber, and $\lambda_0$ is the wavelength at which wavelength dependent dispersion is zero.

For pedagogic purposes, the first type fiber having the greatest length over the transmission pathway distance from service provider to end user is denominated the transmission fiber or transmission length while the second type fiber is denominated the additional fiber. (If both are precisely the same length, then one at random is chosen the transmission length.) The first derivative of dispersion with respect to wavelength in the additional fiber at the central operating wavelength should have an opposite sign to that of the transmission fiber. Although it is advantageous for the dispersion per unit fiber length at the central operating wavelength for the transmission fiber to be of opposite sign to that of the additional fiber, a critical property for purposes of the invention is that the first derivative of dispersion with regard to wavelength at the central operating wavelength for the transmission and additional fiber be of opposite sign.

The position in the system of the additional fiber relative to the transmission fiber has many acceptable configurations. The necessary criterion is that both the additional and the transmission fiber are traversed by the signal from a MLM sent between the receiver and sender, e.g. end user and the service provider (or between two end users). Thus the additional fiber is part of the transmission path. However, it is possible to locate this additional fiber in a spool located, for example, at the end user and/or at the service provider. It is also acceptable for the additional fiber to be a part of the transmission cable. Irrespective of location both the transmission fiber and additional fiber should be traversed by the MLM light being transmitted to transmit a signal. The total length of additional fiber, irrespective of location that is present in the transmission path is useful for reducing MPN.

As discussed, it is typically desirable to reduce MPN system penalty to 20 dB or less. The length and the absolute value of the first derivative of dispersion with respect to wavelength at the central operating wavelength, and the dispersion at the central operating wavelength for the additional fiber primarily determine the extent of reduction as shown in equations (1) and (2). (Nevertheless the additional fiber should have a length of at least 0.5 Km.) These parameters, as further shown by equations (1) and (2), in turn depend on the characteristics of the transmission fiber including the first derivative of dispersion with respect to wavelength and the zero dispersion wavelength, and the MLM characteristics including mode partition coefficient, k, and the laser's spectral characteristics. The equations (1) and (2) provide exemplary parameters of the fiber for specific characteristics of the transmission fiber and MLM. Generally, a 20 dB or less loss is achievable by using additional fiber having a first derivative of dispersion with respect to wavelength within approximately 40 percent of that given by these equations and center wavelength within 2 percent of that given by the equations. For example, a typical PON system has a LTF of approximately 20 Km or less and transmission fiber with $\lambda_0$ of approximately 1310 nm, a $S_{o,TF}$ in the range 0.08 to 0.095 ps/nm$^2$ Km and operates in the range 1260 to 1360 nm. Considering a MLM laser with mode partition coefficient in the range 0.2 to 0.5 and for such typical transmission system parameters, an $S_{o,AF}$ in the range −0.40 to −0.60 ps/nm$^2$ Km is useful to obtain a 20 dB or less mode partition loss penalty. Generally, it is also advantageous for the zero dispersion wavelength of the transmission fiber and the additional fiber to be in the spectral range of the transmitted light from the MLM.

It is desirable that the MLM have partition mode coefficient less than 0.5. Although partition coefficients greater than 0.5 are not precluded, they typically lead to system penalties that are more difficult to compensate with an appropriate choice of additional fiber. Typical MLMs acceptable for use in the invention include Fabry-Perot type lasers. A variety of transmission fibers are available for use in the invention. As discussed, such fiber typically has a zero dispersion wavelength in the range 1260 to 1360 nm and more often in the range 1301 to 1321 nm, and $S_{o,TF}$ in the range 0.083 to 0.092 ps/nm$^2$/Km. (Transmission fibers typically have positive values for the first derivative at the central operating wavelength of the dispersion with respect to wavelength.)

Figure 6:
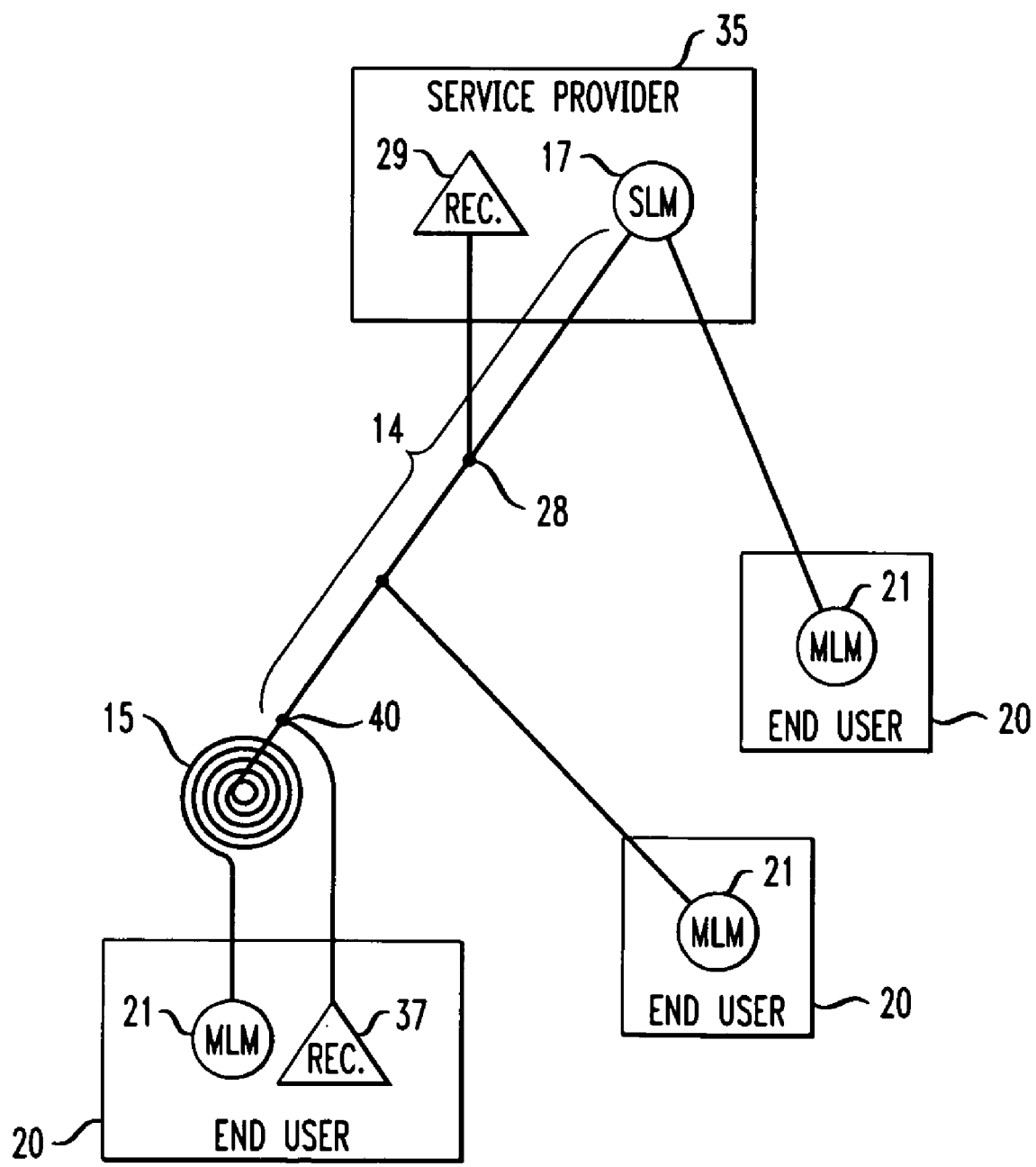
FIG. 6 illustrates an advantageous local area network.

In one advantageous embodiment the invention is employed in a passive optical network such as shown in FIG. 6. G n rally, a SLM, 17, is situated at the service provider. A plurality of end users, 20, have an MLM laser, 21, to interact with service provider, 35, or possibly to interact with other end users similarly having MLM lasers. In on advantageous embodiment the additional fiber, 15, to reduce mode partition noise is present at the end user location having an MLM laser, while the transmission fiber is shown by 14. A splitter, 28, is used to direct the signal from MLM to the receiver, 29. The splitter 40 also ensures that the signal from SLM, 17, to the users, 20 does not traverse additional fiber 15, while splitter 40 directs light emanating from SLM 17 to receiver 37. Typically, if the transmitted signal from the SLM traverses the additional fiber, loss is increased since the additional fiber is chosen to reduce loss involving light from a multimode laser source. Thus it is desirable to route light from an SLM so that it does not traverse the additional fiber. It is however, not essential that every MLM laser, 21, have a length of additional fiber. For example, if the end user is quite close (within 1 Km) to the service provider, then typically MPN is not a significant problem for that end user.

I claim:

1. An optical communication network comprising a transmission optical pathway optically linking a transmitter of optical signals and a receiver of optical signals characterized in that said optical pathway comprises a transmission optical fiber and an additional optical fiber wherein the length of said transmission optical fiber is more than 1 Km and equal to or less than 20 Km, the length of said additional fiber is at least 0.5 Km, the zero dispersion wavelength of said transmission fiber and said additional fiber is in the range 1260 to 1360 nm, and wherein the sign of the first derivative of dispersion with respect to wavelength at the central operating wavelength of said additional fiber is the opposite of the sign of the first derivative of dispersion with respect to wavelength at the central operating wavelength of said transmission fiber.

2. The communication network of claim 1 further including a multi longitudinal mode laser in optical communication with said pathway.

3. The optical communication network of claim 2 wherein said laser has a mode partition coefficient in the range 0.2 to 0.5.

4. The network of claim 1 wherein said additional optical fiber is located at said receiver.

5. The optical communication network of claim 1 wherein said additional fiber is located at said transmitter.

6. The optical communication network of claim 1 wherein said network includes a plurality of said receivers.

7. A process for optical communication comprising the steps of transmitting a signal comprising light from a multi longitudinal mode laser on an optical transmission pathway characterized in that said optical transmission pathway comprises a transmission optical fiber and an additional optical fiber, said transmission optical fiber having a length greater than 1 Km and less than or equal to 20 Km, said additional fiber having a length greater than 0.5 Km, said transmission optical fiber and said additional optical fiber having a zero dispersion wavelength in the range 1260 to 1360 nm, the sign of the first derivative of dispersion with respect to wavelength at the central operating wavelength of said additional fiber is the opposite of the sign of the first derivative of dispersion with respect to wavelength at the central operating wavelength of said additional fiber, and the loss for said signal over said optical transmission pathway fiber is less than 20 dB.

8. The process of claim 7 wherein said signal has a mode distribution associated with that from a multi longitudinal mode laser having a mode partition coefficient in the range 0.2 to 0.5.

9. The process of claim 7 wherein a multiplicity of said signals are transmitted.

10. A process for optical communication between a transmitter and a receiver wherein said transmitter transmits a signal from a single mode longitudinal laser and receives a signal from a multi longitudinal mode laser from said receiver wherein the transmission pathway for said multi longitudinal mode laser signal comprises a transmission fiber and an additional fiber, said transmission optical fiber has a length greater than 1 Km and less than 20 Km, said additional fiber has a length greater than 0.5 Km said transmission optical fiber and said additional fiber having a zero dispersion wavelength in the range 1260 to 1360 nm, and the sign of the first derivative of dispersion with respect to wavelength at the central operating wavelength of said additional fiber is the opposite in sign of the first derivative of dispersion with respect to wavelength at the central operating wavelength of said transmission fiber and the loss for said signal from said multi longitudinal mode laser is less than 20 dB; wherein said additional fiber is absent from the transmission path of said signal from said single longitudinal mode laser to said receiver.

* * * * *